(12) United States Patent
Koch et al.

(10) Patent No.: US 9,666,311 B2
(45) Date of Patent: May 30, 2017

(54) NUCLEAR FUEL ASSEMBLY HAVING VARYING SPACING BETWEEN FUEL RODS

(75) Inventors: Robert Koch, Hochstadt (DE); Otmar Bender, Weinsendorf (DE)

(73) Assignee: AREVA NP, Courbevoie (FR)

( * ) Notice: Subject to any disclaimer, the term of this patent is extended or adjusted under 35 U.S.C. 154(b) by 157 days.

(21) Appl. No.: 13/822,550

(22) PCT Filed: May 10, 2012

(86) PCT No.: PCT/EP2012/058689
§ 371 (c)(1),
(2), (4) Date: Jun. 26, 2013

(87) PCT Pub. No.: WO2012/159897
PCT Pub. Date: Nov. 29, 2012

(65) Prior Publication Data
US 2015/0310941 A1    Oct. 29, 2015

(30) Foreign Application Priority Data
May 20, 2011    (EP) .................................... 11305615

(51) Int. Cl.
*G21C 3/328* (2006.01)
*G21C 3/322* (2006.01)
*G21C 1/08* (2006.01)

(52) U.S. Cl.
CPC .............. *G21C 3/328* (2013.01); *G21C 1/084* (2013.01); *G21C 3/322* (2013.01); *Y02E 30/31* (2013.01); *Y02E 30/38* (2013.01)

(58) Field of Classification Search
CPC .................................. G21C 3/328; G21C 3/322
USPC ................... 376/435, 438, 444, 448
See application file for complete search history.

(56) References Cited

U.S. PATENT DOCUMENTS

| 4,649,017 A * | 3/1987 | Couture ................. G21C 19/36 |
| | | 376/272 |
| 4,968,479 A | 11/1990 | Ogiya |
| 5,032,351 A * | 7/1991 | Johansson ............. G21C 3/3424 |
| | | 376/448 |
| 5,572,560 A | 11/1996 | Brown |
| 2001/0003537 A1 | 6/2001 | Helmersson |
| 2016/0035441 A1 * | 2/2016 | Totemeier .............. G21C 3/328 |
| | | 376/409 |

FOREIGN PATENT DOCUMENTS

FR    2 603 416    4/1988

OTHER PUBLICATIONS

IAEA Nuclear Energy Series, No. NF-T-3.6 (2009).*
Pavelkova, J Radioanal Nucl Chem (2015) 304:245-250.*
Forbuyers; http://product.forbuyers.com/d9371084.html.*
International Search Report for corresponding International Application PCT/EP2012/058689.

* cited by examiner

*Primary Examiner* — Jack W Keith
*Assistant Examiner* — Daniel Wasil
(74) *Attorney, Agent, or Firm* — Davidson, Davidson & Kappel, LLC

(57) ABSTRACT

A nuclear fuel assembly having varying spacing between fuel rods is provided. The nuclear fuel assembly includes a bundle of fuel rods. The fuel rods are arranged in a first lattice with a non-uniform pitch between the fuel rods in the lowermost section of the fuel assembly and in a second lattice with a uniform pitch between the fuel rods in the uppermost section of the fuel assembly.

16 Claims, 5 Drawing Sheets

NUCLEAR FUEL ASSEMBLY HAVING VARYING SPACING BETWEEN FUEL RODS

The present invention relates to a nuclear fuel assembly for a boiling water reactor.

BACKGROUND

U.S. Pat. No. 5,572,560 discloses a nuclear fuel assembly comprising a bundle of fuel rods with a spacing between the fuel rods varying along the length of the fuel assembly from a uniform pitch at the bottom part of the fuel assembly to a non-uniform pitch at the top part of the fuel assembly to allow accommodation between the fuel rods of a water channel having an increased cross-section in the top part of the nuclear fuel assembly.

Provision of the water channel having an increased cross-section in the upper part is intended to enhance neutronic efficiency in terms of equalized water-to-fuel ratio for all fuel rod positions.

However, critical power performance is not considered and may be hindered by such arrangement.

SUMMARY OF THE INVENTION

An object of the invention is to provide a nuclear fuel assembly reaching a good compromise between neutronic efficiency and critical power performance.

To this end, a nuclear fuel assembly for a boiling water reactor is provided comprising a bundle of fuel rods comprising a set of fuel rods arranged in a first lattice having a non-uniform pitch between fuel rods in the lowermost section of the fuel assembly, the fuel rods of the set being arranged in a second lattice with a uniform pitch between the fuel rods in the uppermost section of the fuel assembly.

According to other embodiments, the nuclear fuel assembly comprises one or several of the following features, taken in isolation or in any technically possible combination:

- the spacings between the fuel rods of the set vary monotonously along the length of the fuel assembly;
- in the lowermost section, the fuel rods of the set of fuel rods are arranged in groups separated by coolant/moderator gaps;
- the fuel rods of each group are in a regular lattice arrangement;
- the fuel rods of each group are with a uniform pitch between the fuel rods of the group;
- the coolant/moderator gaps are wider than the passages between the fuel rods or rows of fuel rods of each group;
- the nuclear fuel assembly comprises at least one coolant/moderator gap extending substantially radially from a central region of the bundle of fuel rods towards the periphery thereof;
- the nuclear fuel assembly comprises at least one annular coolant/moderator gap;
- the nuclear fuel assembly comprises at least two coolant/moderator gaps extending parallel to each other;
- the nuclear fuel assembly comprises at least one tubular water channel replacing at least one fuel rod in the bundle of fuel rods;
- the water channel is surrounded by the at least one annular coolant/moderator gap;
- the water channel is of constant cross section along the length of the fuel assembly;
- the nuclear fuel assembly comprises at least one individual fuel rod offset from the first lattice in the lowermost section and/or from the second lattice in the uppermost section of the fuel assembly;
- the transition zone between the lowermost section with a non-uniform pitch towards the uppermost section with a uniform pitch is positioned at a height comprised between 30% and 70% of the height of the fuel assembly active zone; and
- all the fuel rods are full-length fuel rods.

BRIEF SUMMARY OF THE DRAWINGS

The invention and its advantages will be better understood on reading the following description, given purely by way of example and made with reference to the drawings, in which.

DETAILED DESCRIPTION

Figure 1:
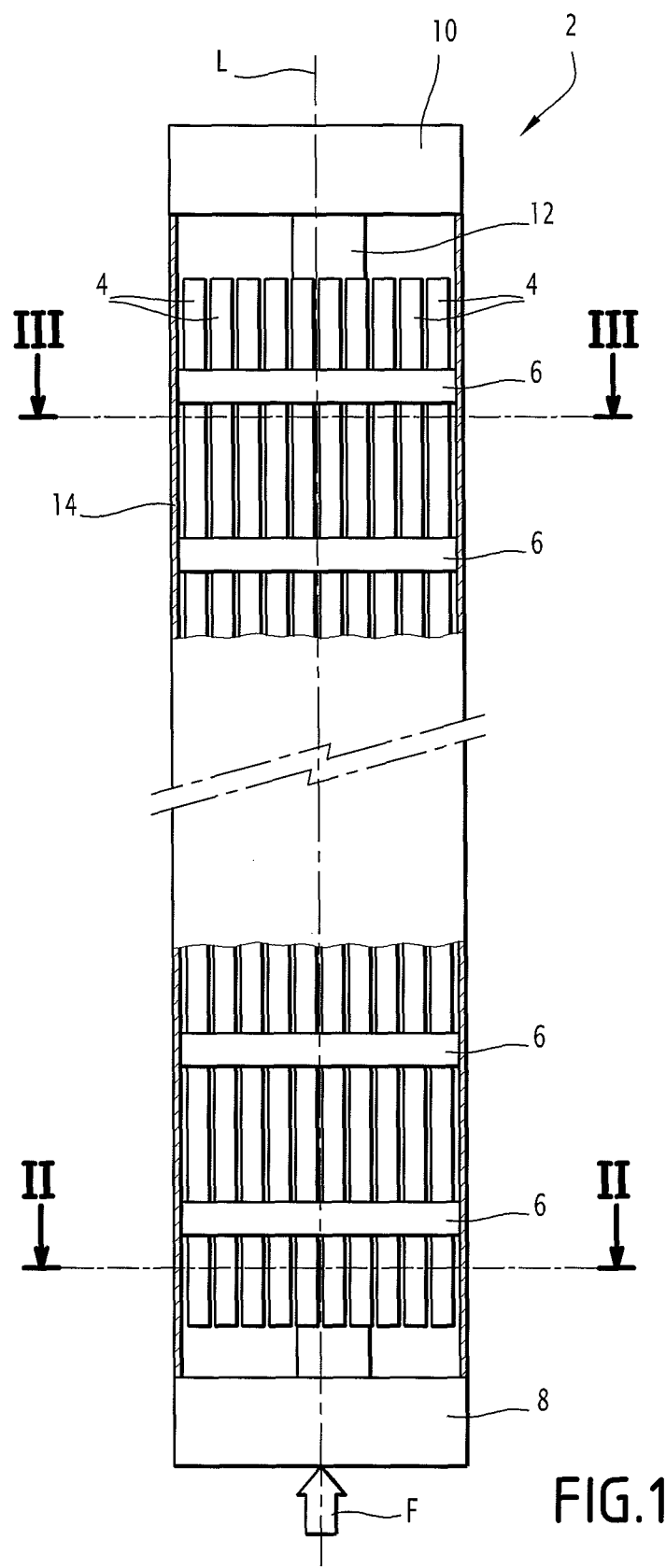
FIG. 1 is a diagrammatic side elevation view of a nuclear fuel assembly according to the invention.

As illustrated on FIG. 1, the nuclear fuel assembly 2 is elongated along a longitudinal axis L. In use, the fuel assembly 2 is placed on the core bottom of a nuclear reactor and the longitudinal axis L extends substantially vertically.

In the following, the terms of orientation such as "top", "bottom", "lower", "upper", "longitudinal", "transversal" and "vertical" are used with reference to the use position with the longitudinal assembly axis L extending vertically.

The nuclear fuel assembly 2 comprises a bundle of fuel rods 4 extending longitudinally. The fuel rods 4 are typically of uniform length.

Each fuel rod 4 is of constant cross section. Each fuel rod 4 comprises a tubular cladding filled with stacked nuclear fuel pellets, constituting the fuel assembly active zone, and is closed at its ends by end plugs. The fuel rods 4 are arranged in a lattice.

The fuel rods 4 exhibit the same cross section. In an alternative embodiment, fuel rods 4 exhibit different cross sections.

The nuclear fuel assembly 2 comprises spacer grids 6 distributed along the length of the fuel rods 4. The spacer grids 6 maintain the fuel rods 4 in spaced relationship in a lattice arrangement and support the fuel rods 4 transversally and longitudinally. The fuel rods 4 conventionally extend through apertures of the spacer grids 6 in contact with springs and/or bosses protruding from the side walls of the apertures for supporting the fuel rods 4.

The nuclear fuel assembly 2 comprises a lower nozzle 8 and an upper nozzle 10 provided respectively at the bottom end and upper end of the nuclear fuel assembly 2. The fuel rods 4 extend from the lower nozzle 8 to the upper nozzle 10.

The nuclear fuel assembly 2 is of the type adapted for use in a boiling water reactor (BWR).

More specifically, the nuclear fuel assembly 2 comprises a tubular water channel 12 extending longitudinally in place of at least one fuel rod 4 in the lattice of fuel rods 4. The water channel 12 is provided for channeling a coolant/moderator (e.g. water) separately from the bundle of fuel rods 4.

The water channel 12 has a constant cross section along its length. In an alternative embodiment, the water channel 12 has a cross section varying along the water channel 12.

The water channel 12 conventionally connects the lower nozzle 8 and the upper nozzle 10. The spacer grids 6 are conventionally secured to the water channel 12.

The nuclear fuel assembly 2 further comprises a tubular fuel channel 14 extending longitudinally and encasing the bundle of fuel rods 4 and the water channel 12. The fuel channel 14 is provided for conducting the coolant/moderator (e.g. water) within the bundle, between and about the fuel rods 4.

In the example illustrated on FIGS. 1-4, the fuel rods 4 are arranged in a 10×10 array. The water channel 12 replaces a 3×3 array of fuel rods 4. The water channel 12 is off-centred with respect to the fuel channel 14. In the embodiment illustrated on FIG. 5, the water channel 12 replaces a 3×3 array at the centre of a 11×11 array.

In use, the nuclear fuel assembly 2 is positioned vertically inside the core of a nuclear reactor and coolant/moderator is fed in the water channel 12 and the fuel channel 14 through the lower nozzle 8 towards the upper nozzle 10, as illustrated on FIG. 1 by arrow F. The coolant/moderator is progressively partially vaporized when flowing about the fuel rods 4. The proportion of vapour increases from bottom to top with respect to liquid. The void content in the coolant/moderator increases progressively from bottom to top.

In the following, spacing or pitch between adjacent fuel rods refer to spacing or pitch between the centrelines of adjacent fuel rods.

A lattice, array or group of fuel rods with a uniform pitch designates a lattice, array or group of fuel rods arranged at nodes of a lattice with the same spacing between each pair of adjacent nodes.

A lattice, array or group of fuel rods with a non-uniform pitch designates a lattice, array or group of fuel rods arranged at nodes of a lattice with a non-uniform distribution of nodes in the lattice and different spacings between the pairs of adjacent fuel rods.

Figure 2:
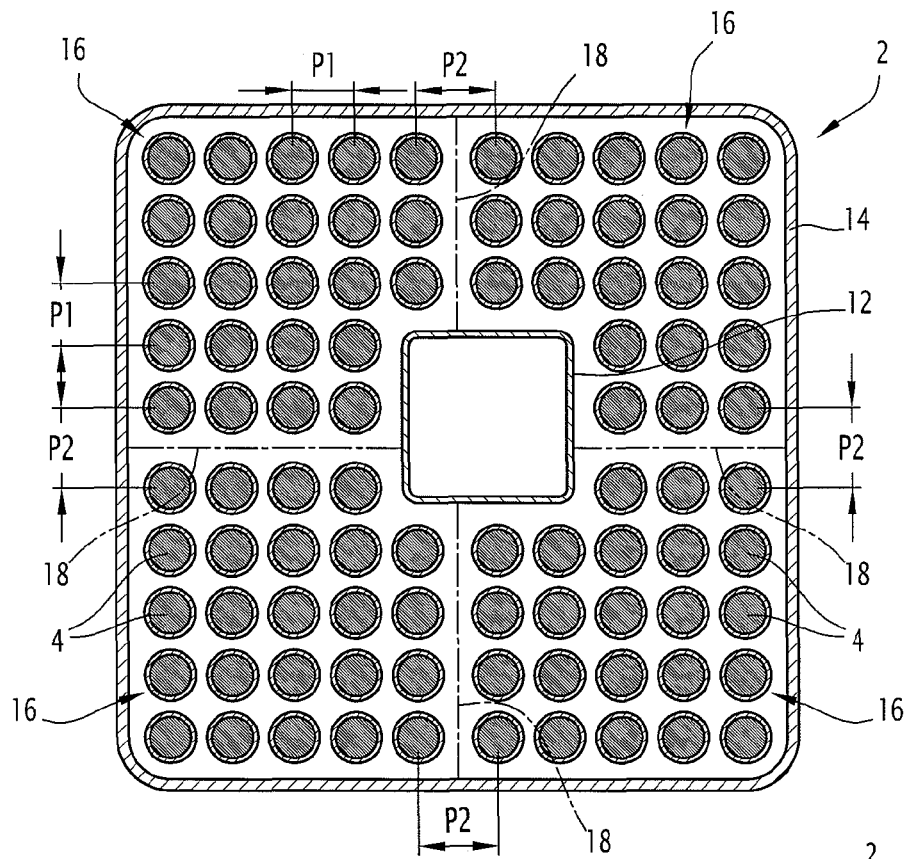
FIGS. 2 and 3 are cross sectional views of the nuclear fuel assembly respectively along II-II and III-III on FIG. 1.
Figure 3:
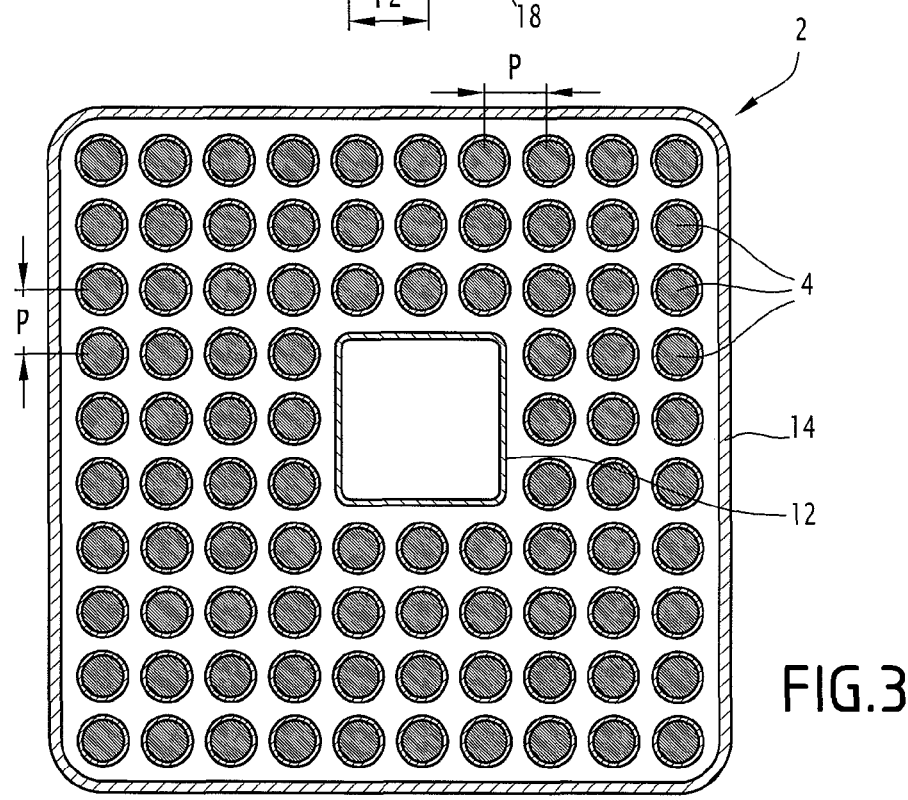

According to one aspect of the invention, the fuel rods 4 are arranged in a first lattice with a non-uniform pitch between fuel rods 4 at the lowermost section of the nuclear fuel assembly 2 (FIG. 2) and in a second lattice with a uniform pitch P between fuel rods 4 at the uppermost section of the nuclear fuel assembly 2 (FIG. 3).

Owing to the modification of the overall lattice arrangement of the bundle of fuel rods 4 along the length of the fuel assembly 2, the spacing between at least some of the fuel rods 4 varies along the length of the fuel assembly 2.

Preferably, the spacing varies monotonously along the length of the fuel assembly. The pitch between each pair of adjacent fuel rods either is constant or increases or decreases along the length of the fuel assembly.

FIG. 2 is a cross sectional view of the lowermost section of the nuclear fuel assembly 2 along II-II in FIG. 1. In this lowermost section, the fuel rods 4 are arranged in a first lattice having a non-uniform pitch. The spacing between the centrelines of the adjacent fuel rods 4 differs between at least some pairs of fuel rods 4.

As illustrated, the fuel rods 4 are gathered in groups 16 of fuel rods 4, each group 16 having a uniform pitch between its fuel rods 4. The fuel rods 4 of each group 16 are arranged in a regular square lattice arrangement with a uniform pitch P1 between the fuel rods 4 in both directions of the lattice arrangement.

Coolant/moderator gaps 18 are defined between the groups 16 of fuel rods 4. Each pair of adjacent groups 16 is separated by a coolant/moderator gap 18 extending between the facing fuel rods 4 of said two groups 16.

The adjacent fuel rods 4 of two different groups 16 delimiting a coolant/moderator gap 18 have a spacing P2 different from the pitch P1 between fuel rods 4 of each group 16. Preferably, the spacing P2 between the fuel rods 4 of different groups 16 delimiting a coolant/moderator gap 18 is higher than the pitch P1 between the fuel rods 4 of each group 16.

As a result, each pair of adjacent groups 16 are separated by a coolant/moderator gap 18 which has a width greater than the passages between the rows of fuel rods 4 of each of groups 16.

FIG. 3 is a cross sectional view of the uppermost section of the nuclear fuel assembly 2 along III-III in FIG. 1. In the uppermost section, the fuel rods 4 are arranged in a second lattice having a uniform pitch P which is the same between each pair of adjacent fuel rods 4.

In the illustrated embodiment, the second lattice in the uppermost section is a regular square lattice.

The invention is not limited to 10×10 bundle of fuel rods. The bundle of fuel rods may comprise a different amount of fuel rods 4 in a square array (e.g. 8×8, 9×9 . . . 13×13) or have any other array pattern such as rectangular array or hexagonal array.

The invention is not limited to a single water channel replacing a 3×3 array of fuel rods. The water channel may exhibit a square cross section replacing another amount of fuel rods (2×2, 3×3, 4×4 . . . ) or a different cross section, e.g. a rectangular or round cross section. The nuclear fuel assembly may comprise more than one water channel or an alternative water structure, e.g. two or more separate water channels or water rods.

In the embodiment illustrated on FIG. 2, the 10×10 bundle of fuel rods 4 is divided in four groups 16 each of 5×5 array with one fuel rod at each node (except for the locations replaced by the water channel 12) separated by four coolant/moderator gaps 18. Each coolant/moderator gap 18 extends substantially radially from the water channel 12 towards the centre of a face of the fuel channel 14.

Coolant/moderator gaps may be defined with various other patterns.

Figure 4:
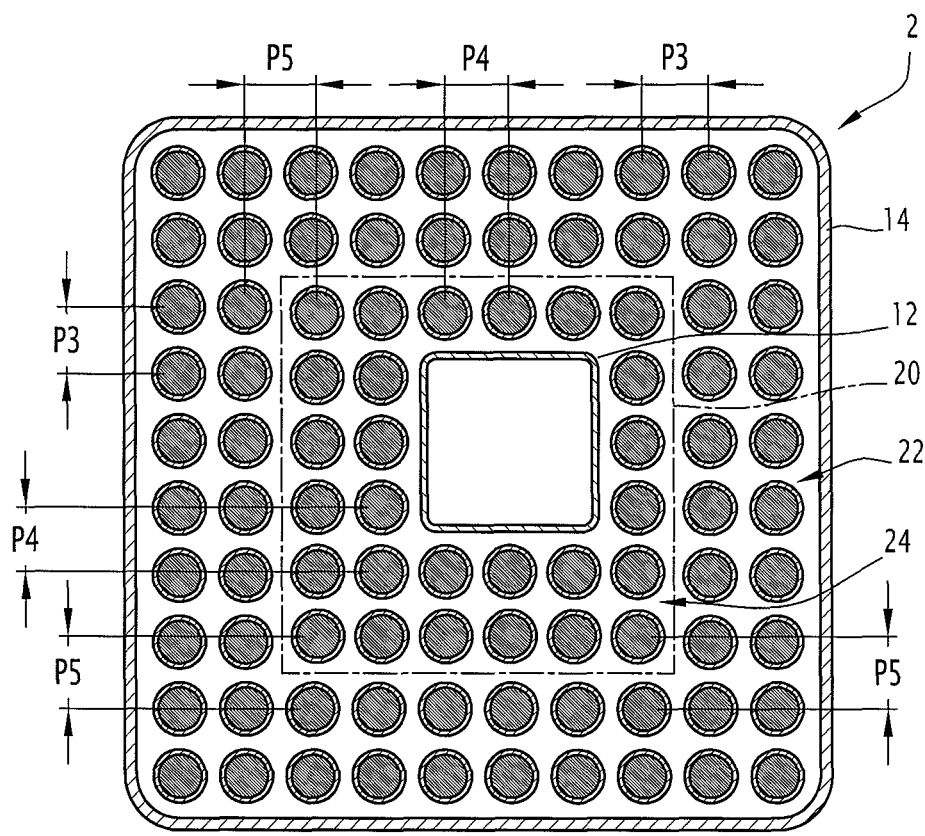
FIGS. 4 and 5 are views analogous to FIG. 2 illustrating nuclear fuel assemblies according to other embodiments of the invention.

In a variant illustrated on FIG. 4, an annular coolant/moderator gap 20 is formed in the bottom section of the nuclear fuel assembly 2 between an annular peripheral group 22 of fuel rods 4 and a central group 24 of fuel rods 4.

In this example, the peripheral group 22 comprises two rows of fuel rods 4 and the central group 24 is defined by the central 6×6 array in the lattice. The water channel 12 replaces a 3×3 array in the central group 24. Two adjacent sides of the water channel 12 are separated from the peripheral group 22 by two rows of fuel rods 4 and the two remaining adjacent sides of the water channel 12 are separated from the peripheral group 22 by a single row of fuel rods 4.

The fuel rods 4 of the peripheral group 22 are arranged in a regular square lattice arrangement with a uniform pitch P3 between the fuel rods 4. The fuel rods 4 of the central group 24 are arranged in a regular square lattice arrangement with a uniform pitch P4 between the fuel rods 4. The adjacent fuel rods 4 of the groups 22, 24 have a spacing P5 between them in the transverse direction of the lattices of the groups 22, 24.

Figure 5:
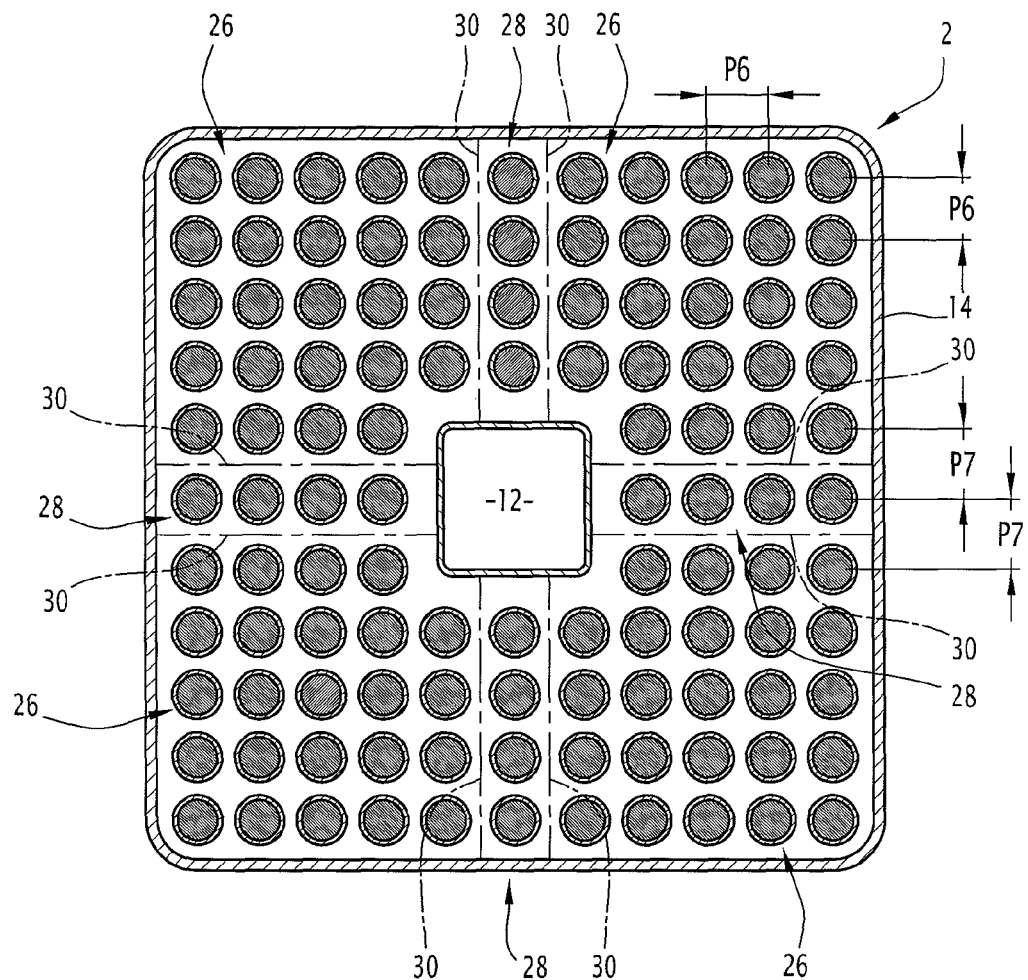

In a variant illustrated on FIG. 5, the bundle of fuel rods 4 comprises coolant/moderator gaps 30 extending parallel to each other in the lowermost section of the nuclear fuel assembly 2.

More specifically, in the example of FIG. 5, the nuclear fuel assembly 2 comprises a bundle of fuel rods 4 arranged in an 11×11 array and a water channel 12 replacing the central 3×3 array. The bundle is subdivided in four corner groups 26 of fuel rods 4 in a 5×5 array in the corners of the bundle. Each pair of corner groups 26 are separated by an intermediate group 28 of fuel rods 4 in a 4×1 array. Two parallel coolant/moderator gaps 30 are provided on each side of each intermediate group 28, between the intermediate group 28 and each adjacent corner group 26.

The fuel rods 4 of each corner groups 26 are arranged in a regular square lattice arrangement with a uniform pitch P6. The spacing P7 between the fuel rods 4 of each intermediate groups 28 and the adjacent fuel rods 4 of the adjacent corner groups 26 is the same.

Each pair of adjacent parallel coolant/moderator gaps 30 are separated by a single row of fuel rods 4. In an alternative, two parallel coolant/moderator gaps may be separated by an intermediate group of fuel rods comprising two or more rows of fuel rods.

In the embodiment illustrated on FIGS. 2, 4 and 5, the pitches of the different groups 16 are equal and the spacings between the adjacent groups 16 are equal. In alternative or in option, the groups may have different pitches and/or the spacings between the groups may be different.

Besides, in the embodiment illustrated on FIGS. 2, 4 and 5, each group 16, 22, 24, 26, 28 has a uniform pitch with fuel rods 4 in a regular square lattice arrangement. In alternative or in option, the fuel rods of at least one group 16, 22, 24, 26, 28 may be arranged in a different regular lattice arrangement yet with a non-uniform pitch, e.g. in a rectangular lattice arrangement with two different pitches in two transverse direction of the lattice.

The spacing variation between the fuel rods may be operated continuously along the length of the fuel assembly, step-by-step or abruptly. In any case, the pitch variation is operated monotonously from the non-uniform pitch lowermost section of the nuclear fuel assembly towards the uniform pitch uppermost section of the nuclear fuel assembly.

The pitch variation or a step of pitch variation may be operated in the span between two adjacent spacer grids 6.

Figure 6:
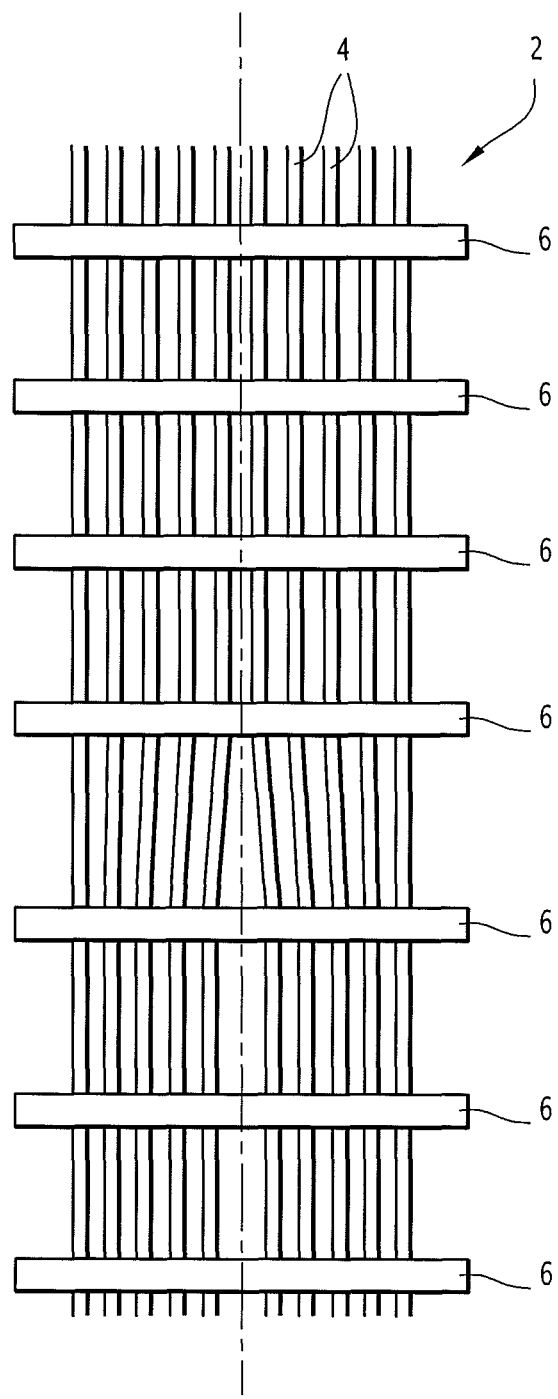
FIG. 6 is a partial diagrammatic side view of a nuclear fuel assembly according to the invention.

FIG. 6 illustrates an embodiment in which the pitch variation is operated in a single step in the span between two adjacent spacer grids 6.

The spacer grids below the pitch variation define apertures for the fuel rods in the lattice with the non-uniform pitch and the spacer grids above the pitch variation define apertures for the fuel rods in the lattice with the uniform pitch.

A nuclear fuel assembly according to the invention enables reaching a good compromise between neutronic efficiency, i.e. maximizing the total fission rate over the fuel assembly cross section and thereby maximizing reactivity, and critical power performance, i.e. the maximum fuel assembly power possible before the coolant film around the fuel rods is interrupted, thus potentially leading to damage of fuel rods.

Typically, fuel rods having a certain U-235 enrichment and adjacent to large coolant/moderator areas, e.g. outer row fuel rods or fuel rods next to a water channel, have larger power than fuel rods surrounded by others fuel rods.

Besides, in the BWR nuclear fuel assembly, coolant is progressively partly converted to vapour when flowing through the nuclear fuel assembly upwardly, whereby void content in the coolant flow increases progressively upwardly and fuel rod cooling becomes less efficient.

Non-uniform pitch arrangements between the fuel rods allow providing an inhomogeneous distribution of coolant. Namely, the non-uniform pitch allows providing wider coolant/moderator gaps resulting in more coolant being directed into coolant/moderator gaps about the fuel rods adjacent to the coolant/moderator gaps and less coolant directed about fuel rods not adjacent to a coolant/moderator gap. Proportional to the amount of coolant/moderator around the fuel rods the number of thermal neutrons increases thus leading to an increased fission rate and consequently to an improved fuel utilization.

In particular, coolant/moderator gaps are positioned proximate the middle fuel rod rows where the local fuel rod power is usually the highest in the bundle and the coolant/moderator gaps are most effective.

The uniform fuel rod pitch in the uppermost section increases critical power performance of the nuclear fuel assembly.

As a matter of fact, void content of the coolant is increased in the uppermost section and cooling becomes less efficient in general. The uniform fuel rod pitch favours a uniform coolant distribution in the uppermost section. It is assumed that regarding critical power performance a homogeneous coolant distribution in the uppermost section of the fuel assembly where coolant is high voided is preferable. Conversely, generating coolant/moderator gaps in the uppermost section would lead to less coolant around fuel rods not adjacent to a coolant/moderator gap whereby critical power would be reduced which degrades the overall fuel efficiency of a fuel assembly.

Besides the neutronic efficiency benefit of an inhomogeneous coolant distribution is becoming smaller with increasing void content in the coolant. The positive neutronic effect provided by non-uniform pitch is kept in the lowermost section where detrimental effect on critical power performance is small.

Thus, an inhomogeneous fuel rod pitch in the lowermost section of the nuclear fuel assembly and a homogeneous fuel rod pitch in the uppermost section is a good compromise between neutronic efficiency and critical power performance, more particularly when the transition zone between the lowermost section with a non-uniform pitch towards the uppermost section with a uniform pitch is positioned at a height comprised between 30% and 70% of the height of the fuel assembly active zone.

Indeed, the transition zone from the lowermost section with fuel rods in a non-uniform pitch lattice towards the uppermost section with a uniform pitch lattice of the nuclear fuel assembly should be located in the fuel active zone wherein the net fuel consumption gain by dry-out performance and neutronic efficiency is maximized. Such pitch variation may be located around the centre of the axial active zone but such transition zone from the lowermost section with a non-uniform pitch lattice towards the uppermost section with a uniform pitch lattice of the nuclear fuel assembly will furthermore depend on the chosen axial spacer grid positions between the lower and upper nozzles.

The invention is particularly advantageous for nuclear fuel assembly of the BWR type.

In the embodiments illustrated in FIGS. 1-6, the fuel rods are full-length fuel rods of substantially the same length.

In an alternative embodiment, the bundle of fuel rods comprises part-length fuel rods of shorter length than the full-length fuel rods. Possibly there may be different kinds of part-length fuel rods, i.e. differing in length. The fuel rods (including both the part-length fuel rods and the full-length fuel rods) are arranged in a first lattice with a non-uniform pitch at the lowermost section of the nuclear fuel assembly. Depending on the total length of the part-length fuel rods, the lattice with the uniform pitch in the uppermost section of the fuel assembly can either include only the remaining full-length rods or additionally all or a portion of the part-length rods.

In the embodiments of FIGS. 1-6, all the fuel rods are arranged in the first lattice with a non-uniform pitch at the lowermost section and in the second lattice with a uniform pitch at the uppermost section.

In an alternative embodiment, the bundle of fuel rods comprises at least one individual fuel rod which is offset with respect to a pitch in the lowermost lattice and/or from the uniform pitch of the second lattice in the uppermost section of the nuclear fuel assembly, thus creating a local non-uniformity. Such a fuel rod is for example a fuel rod located at a corner of the bundle which is offset towards the centre of the bundle in order to maintain a certain clearance between said fuel rod and the fuel channel.

However, except from the offset fuel rods creating local non-uniformity, the fuel rods of the remaining set of fuel rods are arranged in a first lattice of non-uniform pitch in the lowermost section and in a second lattice with a uniform pitch in the uppermost section.

Hence, in a general manner, the nuclear fuel assembly comprises a bundle of fuel rods comprising at least a set of fuel rods arranged in a first two dimensional lattice of non-uniform pitch in the lowermost section and in a second two dimensional lattice of uniform pitch in the uppermost section of the nuclear fuel assembly.

The alternatives mentioned above may be combined thus providing a bundle of fuel rods comprising full-length and part-length fuel rods as well as locally offset individual fuel rods.

What is claimed is:

1. A nuclear fuel assembly for a boiling water reactor comprising:
    a bundle of fuel rods comprising a set of fuel rods, the fuel rods of the set of fuel rods being arranged at the nodes of a first lattice having a non-uniform distribution of nodes at a lowermost end of the fuel assembly, the fuel rods of the set of fuel rods being arranged at the nodes of a second lattice having a uniform distribution of nodes at an uppermost end of the fuel assembly, the second lattice having the uniform distribution of nodes including the fuel rods of the set arranged at nodes of the second lattice with a same spacing between each pair of adjacent nodes, the first lattice having the non-uniform distribution of nodes including the fuel rods of the set arranged at nodes of the first lattice with at least two different spacings between pairs of adjacent nodes.

2. The nuclear fuel assembly as in claim 1, wherein the spacings between the fuel rods of the set vary monotonously along the length of the fuel assembly.

3. The nuclear fuel assembly as in claim 1, wherein, in the lowermost section, the fuel rods of the set of fuel rods are arranged in groups separated by coolant/moderator gaps.

4. The nuclear fuel assembly as in claim 3, wherein the fuel rods of each group are with a uniform pitch between the fuel rods of said group.

5. The nuclear fuel assembly as in claim 3, wherein the coolant/moderator gaps are wider than passages between the fuel rods or rows of fuel rods of each group.

6. The nuclear fuel assembly as in claim 3, wherein the coolant/moderator gaps include at least one coolant/moderator gap extending substantially radially from a central region of the bundle of fuel rods towards the periphery thereof.

7. The nuclear fuel assembly as in claim 3, wherein the groups including a central group and a peripheral group surrounding the central group, the coolant/moderator gaps including a coolant/moderator gap between the central group and the peripheral group.

8. The nuclear fuel assembly as in claim 3, wherein the coolant/moderator gaps include at least two coolant/moderator gaps extending parallel to each other.

9. The nuclear fuel assembly as in claim 1 further comprising at least one tubular water channel.

10. The nuclear fuel assembly as in claim 9 further comprising at least one coolant/moderator gap, the at least one tubular water channel being surrounded by the at least one coolant/moderator gap.

11. The nuclear fuel assembly as in claim 9, wherein the at least one tubular water channel is of constant cross section along the length of the fuel assembly.

12. The nuclear fuel assembly as in claim 1, wherein the bundle of fuel rods includes at least one individual fuel rod which is offset at least one of from the first lattice in the lowermost section and from the second lattice in the uppermost section of the fuel assembly.

13. The nuclear fuel assembly as in claim 1, wherein a transition zone between the lowermost section with a non-uniform pitch towards the uppermost section with a uniform pitch is positioned at a height comprised between 30% and 70% of the height of an active zone of the fuel assembly.

14. The nuclear fuel assembly as in claim 1, wherein all the fuel rods are full-length fuel rods.

15. The nuclear fuel assembly as in claim 3, wherein the fuel rods of each group are in a square or rectangular lattice arrangement.

16. A nuclear fuel assembly for a boiling water reactor comprising:
    a bundle of fuel rods comprising a set of fuel rods arranged in a first lattice having a non-uniform pitch in a lowermost section of the fuel assembly and arranged in a second lattice with a uniform pitch in an uppermost section of the fuel assembly,
    a transition zone between the lowermost section with a non-uniform pitch towards the uppermost section with a uniform pitch is positioned at a height comprised between 30% and 70% of the height of an active zone of the fuel assembly.

* * * * *